United States Patent
Takao et al.

(10) Patent No.: US 7,120,526 B2
(45) Date of Patent: Oct. 10, 2006

(54) METHOD OF DISCRIMINATING OBJECT ON SEAT

(75) Inventors: Masato Takao, Hikone (JP); Hirofumi Mita, Shiga (JP); Junji Azuma, Hikone (JP)

(73) Assignee: Takata Corporation, Tokyo (JP)

( * ) Notice: Subject to any disclaimer, the term of this patent is extended or adjusted under 35 U.S.C. 154(b) by 259 days.

(21) Appl. No.: 10/895,047

(22) Filed: Jul. 21, 2004

(65) Prior Publication Data

US 2005/0071062 A1    Mar. 31, 2005

(30) Foreign Application Priority Data

Sep. 30, 2003    (JP) .............................. 2003-340294

(51) Int. Cl.
*B60K 28/04*    (2006.01)
(52) U.S. Cl. .......................... 701/45; 180/273; 701/46; 701/47
(58) Field of Classification Search ............ 701/45–49; 180/271, 273; 340/500; 307/9.1, 10.1
See application file for complete search history.

(56) References Cited

U.S. PATENT DOCUMENTS

| | | | | |
|---|---|---|---|---|
| 5,573,269 A | * | 11/1996 | Gentry et al. | 280/735 |
| 5,739,757 A | * | 4/1998 | Gioutsos | 340/667 |
| 6,345,839 B1 | * | 2/2002 | Kuboki et al. | 280/735 |
| 6,467,804 B1 | * | 10/2002 | Sakai et al. | 280/735 |
| 6,490,515 B1 | * | 12/2002 | Okamura et al. | 701/49 |
| 6,509,653 B1 | * | 1/2003 | Fujimoto et al. | 307/10.1 |
| 7,043,997 B1 | * | 5/2006 | Mattson et al. | 73/800 |

FOREIGN PATENT DOCUMENTS

JP    2001-74541    3/2001

* cited by examiner

*Primary Examiner*—Yonel Beaulieu
(74) *Attorney, Agent, or Firm*—Foley and Lardner LLP (57) ABSTRACT

A method of discriminating the state of an object on a vehicle seat. The method includes taking samples of a signal indicative of seat load. It is provisionally determined that the object is in a second state if the seat load exceeds a first threshold, and it is provisionally determined that the object is in a first state if the seat load is less than a second threshold. It is determined that the object is in the first state if it is provisionally determined that the object is in the first state and if it is not provisionally determined that the object is in the second state. It is determined that the object is in the second state if it is provisionally determined that the object is in the second state and if it is not provisionally determined that the object is in the first state.

27 Claims, 3 Drawing Sheets

PRIOR ART

*Fig. 5(b)*

PRIOR ART

METHOD OF DISCRIMINATING OBJECT ON SEAT

BACKGROUND

The present invention relates to a method of discriminating a state of an object on a seat (for example, whether or not a human being is on board, whether or not the human being on board is an adult or a child) based on a signal (seat load) from a seat load meter for measuring the weight of the seat and the object placed thereon.

Hitherto, a seat load meter for measuring the weight of a seat and an object which is placed thereon (normally a human being) is often provided under the seat. Such a seat load meter is used, for example, for controlling deployment of an airbag.

In the control of deployment of the airbag, when the object placed on the seat is a child or a child seat, the airbag is controlled to be deployed by a soft-deployment mode. When the seat is vacant, the airbag may be controlled so as not to be deployed.

In this manner, it is necessary to know the state of the object placed on the seat according to the measured value (seat load) measured by the seat load meter. Therefore, generally, a method of discriminating by discriminating several thresholds for the seat load and, for example, discriminating the seat to be vacant when the seat load is a first threshold or below, to be occupied by a child when the seat load is between the first threshold and a second threshold exclusive, to be occupied by an adult when the seat load is between the second threshold and a third threshold, and to be loaded with a child seat when it exceeds the third threshold is employed.

However, in practice, the output of the seat load meter changes with time as a result of change in posture of the human being, the vertical acceleration, etc., during movement of the vehicle. Therefore, when the measured value is close to the threshold, the output of the seat load meter often exceeds the threshold and moves up and down. In such a case, discrimination of the state of the object placed on the seat changes frequently, and hence unfavorable influences may exist.

As a method of preventing such frequent change in discrimination of the state, Japanese Unexamined Patent Application Publication No. 2001-74541 (Patent Document 1), the contents of which are incorporated herein by reference in their entirety, discloses a method of dividing one threshold into two for providing hysteresis for the discrimination of the state.

Figure 5A:
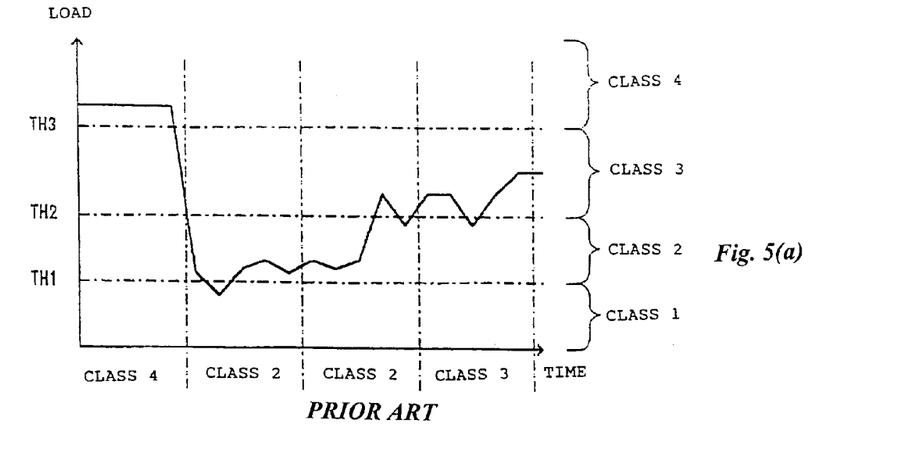
FIG. 5(a) is a drawing showing data relating to a method of discrimination of the state of the object on the seat in the related art.
Figure 5B:
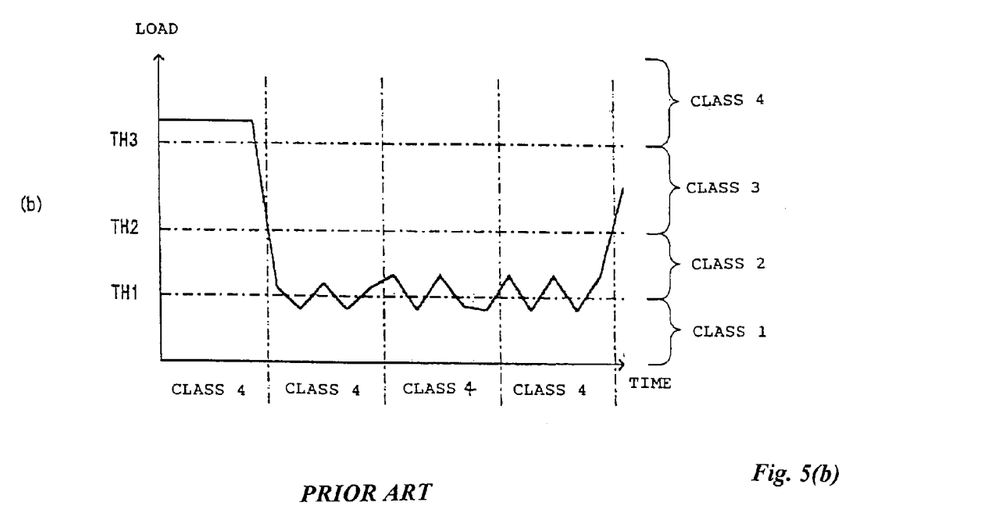
FIG. 5(b) is a drawing showing additional data relating to the method of discrimination of the state of the object on the seat in the related art.

As a method of preventing frequent change in discrimination of the state, there is a method of discrimination the state to correspond to the range of the seat loads when the ratio of the actual measured value of the seat load being within a predetermined range of the seat loads reaches or exceeds a predetermined value. This method is shown with reference to FIGS. 5(a) and 5(b). In FIGS. 5(a) and 5(b), there are provided three thresholds TH1, TH2, and TH3, whereby the state is divided into class 1 to class 4.

The method of discriminating the state is such that the output of the seat load meter is sampled, and when four data out of five samplings are in the same class, the state is switched to the corresponding class. In FIG. 5(a), at the beginning, since all data exceed TH3, and in Class 4, it is discriminated to be in the state of Class 4. In the next five samplings, since four data are between TH1 and TH2, which corresponds to Class 2, the discriminated state is switched to Class 2. Then, in the next five samplings, since four data are between TH1 and TH2, which corresponds to Class 2, the discriminated state remains in Class 2. In the next five samplings, four data are between TH2 and TH3, which corresponds to Class 3, the discriminated state is switched to Class 3.

However, the method used to discriminate the state when receiving input as shown in FIGS. 5(a) and 5(b) has a problem. For example, as shown in FIG. 5(b), the measured value of the seat load meter may fluctuate around the threshold, and when four samplings are not in the same class as a result of five times of sampling, the previous state is maintained indefinitely, and hence the discriminated state departs from the actual state.

In FIG. 5(b), since all data exceed TH3 at the beginning, the state is discriminated to be Class 4. In the next five samplings, since only three data are in Class 2. Therefore, the state is not discriminated to be Class 2, and the discriminated state is maintained in Class 4. Then, in the next five samplings, since only three data are in Class 1, the state is not discriminated to be Class 1, and the discriminated state is maintained in Class 4. In the next five samplings, since only three data are in Class 2, the state is not discriminated to be Class 2, and the discriminated state is maintained in Class 4. In this manner, the state in which the state is discriminated to be Class 4 continues although the actual data shows Class 1 or Class 2.

In view of such problems, it is an object of the present invention to provide a method of discriminating the state of an object on a seat in which the state can be switched to the state that can be discriminated accurately even when the measured value fluctuates around the threshold.

SUMMARY OF THE INVENTION

According to a first exemplary embodiment of the present invention, a method of and an apparatus for discriminating the state of an object on a seat based on a signal (seat load) from a seat load meter for measuring the weight of the seat and the object placed thereon is provided. According to the embodiment, a first state which corresponds at least to a first range of seat loads and a second state corresponding to a second range of seat loads, which is the range of larger seat loads than the first range of seat loads, are discriminated by (1) providing a first load threshold and a second load threshold, which is larger than that, and when the state in which the seat load exceeds the first threshold meets a predetermined condition, discriminating the state provisionally to be the second state. When the state in which the seat load underruns the second threshold meets the predetermined condition, discriminating the state provisionally to be the first state. Further, when only discriminated to be the first state or only discriminated to be the second state in the provisional discrimination in (1), discriminating the provisional discrimination to be the final discrimination.

When it is discriminated to be the first state and simultaneously to be the second state in the provisional discrimination in (1), employing the state which has a higher priority as the final discrimination.

According to the first embodiment, the two thresholds are provided for discriminating in which states out of two states the seat load is, and whether it is in the first state or in the second state is provisionally discriminated according to the above-described method. When the provisionally discriminated state is one of the first state and the second state, the specific state is employed as the final state.

It is to be noted that there is a case in which it is provisionally discriminated to be both the first state and the second state. On the contrary, the present invention is configured not to discriminate the state to be neither the first state nor the second state even when such a case occurs. Actually, there may be states other than the first state and the second state, such as a third state or a fourth state. However, since things that are concerned with here is which of the first state or the second it belongs to, they are not taken into account. For example, assuming that it is demarcated, from the smaller load in sequence, into the third state, the first state, the second state, and the fourth state, the third state is included in the first state and the fourth state is included into the second state according to the present means. Based on this concept, the method of classifying the first state and the third state, and classifying the second state and the fourth state may be set down separately. The method of the present invention may be applied as a matter of course.

In addition to the first exemplary embodiment of the present invention, there is a second exemplary embodiment which may solve the above-described problem which includes a method of and an apparatus for discriminating the state of the object on the seat based on the signal (seat load) from the seat load meter for measuring the weight of the seat and the object placed thereon, wherein the first state corresponding at least to the first range of seat loads and the second state corresponding to the second range of seat loads which is the range of larger seat loads than the range of the first seat loads are discriminated by (1) providing a first load threshold and a second load threshold corresponding to the value larger than that; (a) discriminating provisionally to be the second state when the state in which the seat load exceeds the first threshold meets a predetermined condition, (b) discriminating provisionally to be the first state when the state in which the seat load underruns the second threshold meets a predetermined condition; (2) providing priority to the first state and the second state, and when the first state has a higher priority, the predetermined condition is discriminated so that the state of (b) may be established before the state (a) is established, and when the second state has a higher priority, the predetermined condition is discriminated so that the state of (a) may be established before the state (b) is established.

According to the second exemplary embodiment described above, the condition which has a higher priority may easily be met temporally before the condition which has a lower priority, and hence it is possible to make the condition having a higher priority be met easily.

In addition to the second exemplary embodiment just discussed, there is a third exemplary embodiment which may solve the above-described problem may be practiced such that condition (a) is that the seat loads obtained by sampling the seat load by the predetermined number of times exceeds the first threshold by the predetermined times, and the condition (b) is that the seat loads obtained by sampling the seat load by the predetermined number of times underruns the second threshold by the predetermined times, in that the condition (2) is satisfied by discriminating the number of times of sampling to be the same for (a) and (b), differentiating between the number of times that exceeds the first threshold and the number of times that underruns the second threshold, and employing the condition which is met first.

According to the third exemplary embodiment, the number of times a load signal exceeds the first threshold and the number of times that a load signal underruns the second threshold are differentiated according to the priority during the sampling interval with the same number of times of sampling. By setting the number of times of sampling for the state having higher priority to a small number, the state having higher priority may easily be established.

In addition, a fourth exemplary embodiment which may solve the above-described problem is as follows. The condition (a) is such that the seat load obtained by sampling the seat load by m×i times (m, i are natural numbers) exceeds the first threshold by n×i times, (n is a natural number and m>n) and the condition (b) is that the seat load obtained by sampling the seat load by m×k times (k is a natural number) underruns the second threshold by n×k times, and the condition (2) is satisfied by differentiating the values i and k and employing the condition which is met first.

According to this embodiment, since the condition which corresponds to the smaller one of i and k may easily be established, the priority may be provided accordingly.

Further, there is a fifth exemplary embodiment according to the present invention which may solve the above-described problem. This embodiment is such that when the state changes from the present state to the first state or the second state, the priority is discriminated according to the present state. This may permit flexible control to be achieved since the priority is varied according to the present state.

Moreover, according to a sixth exemplary embodiment of the present invention which may solve the above-described problem, there is a method and apparatus such that at least the third state which is discriminated by a threshold which resides outside the first load threshold and the second load threshold is provided in addition to the first state and the second state, and in that discrimination when the state is changed from the third state to the first state or the second state is such that the lower priority is provided for the state adjacent to the third state.

According to this embodiment, the state may easily be changed to another state while skipping the adjacent state, so that the state to be discriminated may be changed quickly.

According to a seventh exemplary embodiment of the present invention which may solve the above-described problem, the state in which the seat is vacant has a high priority.

According to this embodiment, when the occupant leaves the seat, the fact that the seat is vacant may be detected quickly.

Thus, some or all of the above identified embodiments provide an apparatus for and a method of discriminating the state of an object on a seat in which the state may be switched to the state that may be discriminated accurately even when the measured value fluctuates around the threshold.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
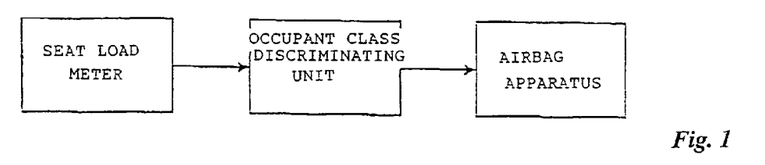
FIG. 1 is a drawing showing an example of a unit for implementing a method of discriminating the state of an object on a seat according to an embodiment of the present invention.

Referring now to the drawings, an example of an embodiment of the present invention will be described. FIG. 1 is a drawing showing an example of a unit for implementing a method of discriminating the state of an object on a seat as the embodiment of the present invention. The measured value of a seat load meter is supplied to an occupant class discriminating unit. The occupant class discriminating unit may discriminate whether the seat is vacant (Class 1), occupied by a child (Class 2), or occupied by an adult (Class 3), by sampling and supplying the measured value at a predetermined time intervals and processing the sampled values, and outputs the result of discrimination to an airbag apparatus. According to the output, in case of emergency, the airbag apparatus does not deploy the airbag in the state in which the seat is vacant, deploys the airbag in a soft-deployment mode when the seat is occupied by a child, and deploys the airbag normally when the seat is occupied by an adult.

Figure 2:
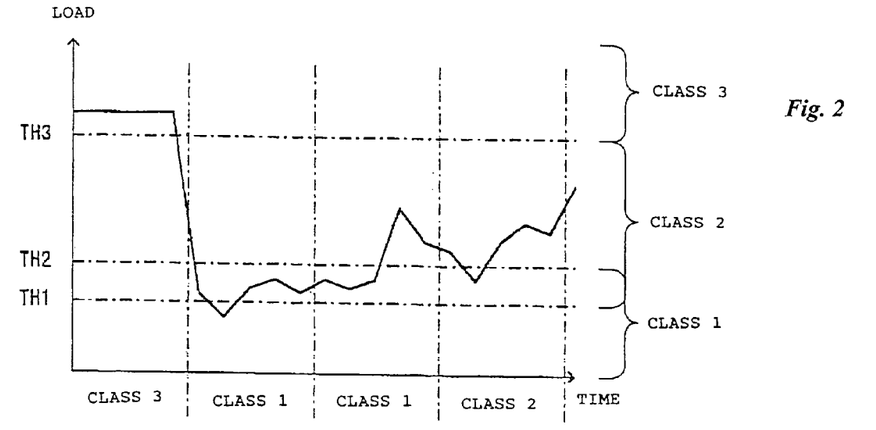
FIG. 2 is an explanatory drawing showing data relating to a method of discriminating the state of the object on the seat according to an embodiment of the present invention.

FIG. 2 is an explanatory drawing showing data relating to a first example of an apparatus for and a method of discriminating the state of the object on the seat according to the present invention. In the first embodiment, two thresholds TH1 and TH2 are used as thresholds for discriminating Class 1 and Class 2. (Although in some other embodiments, it is possible to provide two thresholds for discriminating Class 2 and Class 3 for using the logic described below, discrimination of Class 2 and Class 3 being made by discriminating whether or not the value exceeds a threshold TH3 in this embodiment in order to simplify the description.)

In other words, for example, when the detected seat load is TH2 or below, it is discriminated to be Class 1, when the detected seat load is TH1 or higher, it is discriminated to be Class 2, and when the detected seat load is TH3 or higher, it is discriminated to be Class 3. However, demarcation between Class 1 and Class 2 is not performed by one sampling, but by, for example, five samples. In this example, when two sampled values obtained from five times of sampling are TH2 or below, it is discriminated to be Class 1, when two sampled values obtained from five times of sampling are TH1 or higher, it is discriminated to be Class 2. After this, the output which indicates the current class is maintained until it is discriminated to be in a class different from the current class by class discrimination.

In an example shown in FIG. 2, since all the measured values in the first five samplings are TH3 or higher, it is discriminated to be Class 3. In the next five samplings, since all the five sampled values are TH2 or below, it is discriminated to be Class 1. On the other hand, since three out of five sampled values are TH1 or higher, it is discriminated to be Class 2 as well.

In this example, such logic that discrimination as Class 1 has a priority when discrimination to be Class 1 and discrimination to be Class 2 are simultaneously made is provided in advance. Therefore, in this case, it is discriminated to be Class 1, and the discrimination as Class 3 outputted previously is changed to the output of discrimination as Class 1.

In the next five samplings, three out of five sampled values are TH2 or below, it is discriminated to be Class 1. On the other hand, since all the five sampled values are TH1 or higher, it is discriminated to be Class 2 as well. However, in this case as well, based on the priority discriminating logic described above, it is finally discriminated to be Class 1 and the previous output is maintained.

In the next five samplings, since only one out of five sampled values is TH2 or below, it is not discriminated to be Class 1. On the other hand, since four out of five sampled values are TH1 or higher, it is discriminated to be Class 2. Therefore, the final discrimination is Class 2, and the previous output indicating discrimination as Class 1 is changed to the output of discrimination as Class 2.

Although the results of discrimination are shown for the respective demarcated divisions of sampling in the drawing, since the result of discrimination is outputted at the end of each demarcated division, that is, discrimination is made after the last sampling in each demarcated division, change of the output is performed at this timing as a matter of course. This is applied also to the drawings shown later.

In this manner, even when the measurement is fluctuated at the boundary between Class 1 and Class 2, which state it actually is may be accurately discriminated and discrimination indicating the preferred state may be outputted by priority depending on the object.

Figure 3:
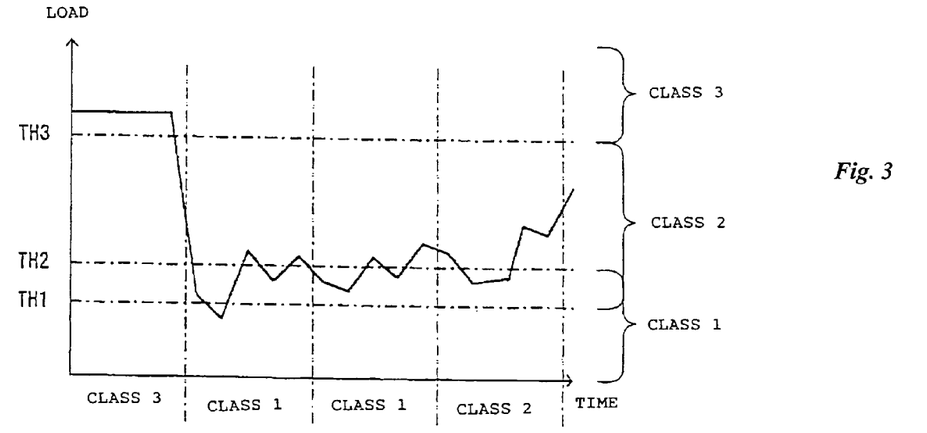
FIG. 3 is an explanatory drawing showing data relating to a method of discriminating the state of the object on the seat according to another embodiment of the present invention.

FIG. 3 shows exemplary data relating to an apparatus and method according to the second embodiment of the present invention for discriminating the state of the object on the seat. The meaning of demarcation of the class and the threshold in this embodiment are the same as the above-described example.

In this embodiment, the identification of demarcation between Class 1 and Class 2 is performed as follows. In other words, when three values obtained from five samples are TH2 or below, it is discriminated to be Class 1. On the other hand, four values obtained from five times of sampling are TH1 or higher, it is discriminated to be Class 2. Then the discrimination made earlier (i.e., first) is discriminated to be the final discrimination.

In an example relating to the data of FIG. 3, in the first five samplings, all of the measured values are TH3 or higher, and thus the state is discriminated to be Class 3. In the next five samplings, since an exemplary condition that three sampled values are TH2 of below is satisfied at the fourth sampling out of five samplings, Class 1 is outputted as the final result of discrimination. Although the exemplary condition that four sampled values are TH1 or higher is satisfied at the fifth sampling, it is ignored since it is already discriminated to be Class 1.

In the next five samplings as well, since the exemplary condition that three sampled values are TH2 or below is satisfied at the fourth sampling out of five samplings, Class 1 is outputted as the final result of discrimination. Although the condition that four sampled values are TH1 or higher is satisfied at the fifth sampling, it is ignored since it is already discriminated to be Class 1.

In the fifth sampling, the exemplary condition that three sampled values are TH2 or below is not satisfied, and the exemplary condition that four sampled values are TH1 or higher is satisfied at the fifth sampling. Thus, class 2 is outputted as the final result of discrimination.

Although it is not shown in the drawings, there is a rare case in which the exemplary condition that four sampled values obtained from five samplings are TH1 or higher is satisfied before the exemplary condition that three sampled values obtained from five samplings are TH2 or below. In this case, final discrimination is Class 2. If priority is desired to be given to Class 2 before Class 1, the number of times to be TH1 or higher may be set to the value smaller than the number of times to be TH2 or below.

In this manner, even when the measured seat load is fluctuated at the boundary between Class 1 and Class 2, the actual state may be accurately discriminated and discrimination indicating the preferred state may be outputted by priority depending on the object.

It is noted here that the above exemplary conditions are just that; exemplary. The number of times that a sampled value is above or below the thresholds before a state is determined may be variable depending on the desired performance of the device/outcome of the method. Moreover, the number of samplings that are needed to determine a state may be variabld depending on the deisired performance.

Figure 4:
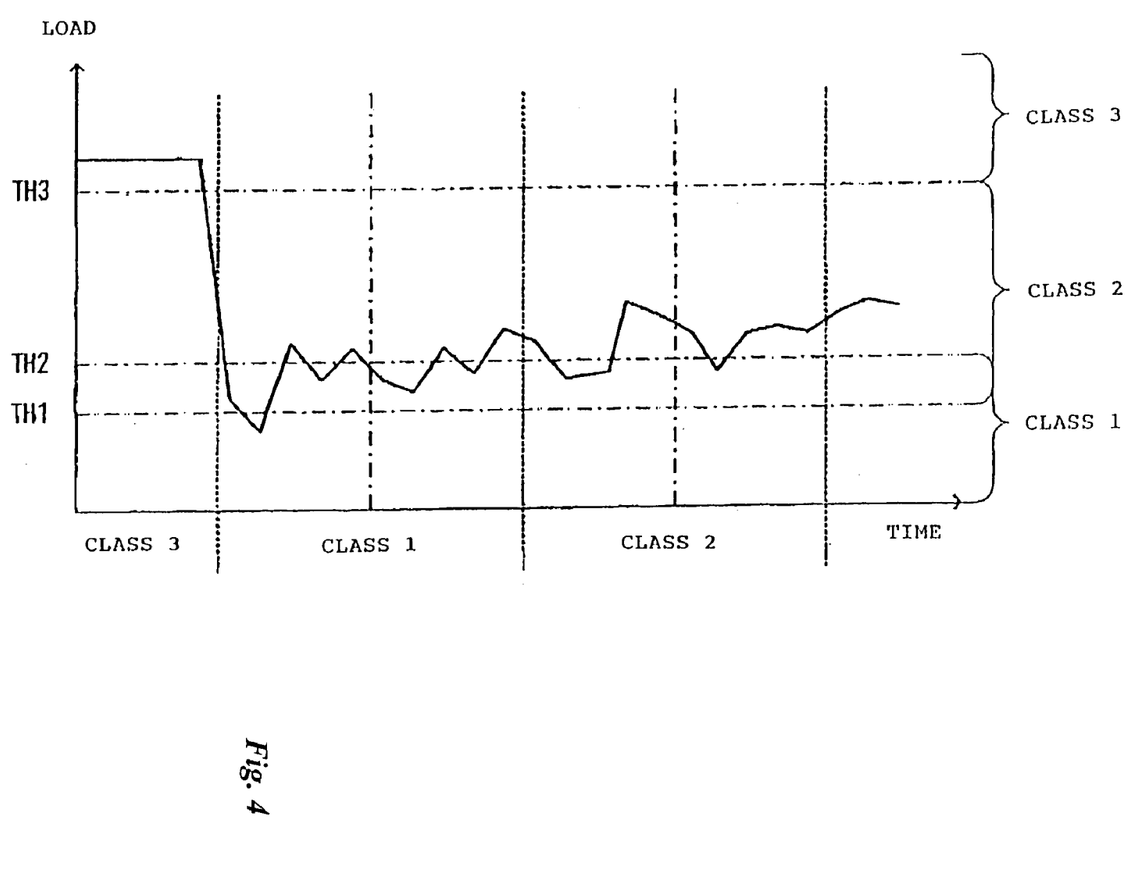
FIG. 4 is an explanatory drawing showing data relating to a method of discriminating the state of the object on the seat according to another embodiment of the present invention.

FIG. 4 is an explanatory drawing showing data relating to a third example of an apparatus for and a method of discriminating the state of the object on the seat. The meaning of demarcation of the class and the threshold in this embodiment are the same as the above-described first example.

In this embodiment, demarcation between Class 1 and Class 2 is as follows. When three sampled values obtained from five times of sampling are TH2 or below, the state is discriminated to be Class 1. On the other hand, when three sampled values obtained from ten times of sampling are TH1 or higher, the state is discriminated to be Class 2. The discrimination made first is discriminated to be the final discrimination. In other words, for example, ten samplings constitutes a unit of discrimination, and in this unit, discrimination of "TH2 or below" is made twice for each of the sets of five samplings.

In the example data shown in FIG. 3, discrimination in the initial state is Class 3. In the first five samplings in a state in which the seat load is decreased, since the condition that "three sampled values are TH2 or below" is satisfied at the fourth sampling, Class 1 is outputted as the final result of discrimination. This corresponds to the output of the state supplied during the ten sampling period. Although the seventh sampling out of these ten samplings, the condition that six/seven sampled values are TH1 or higher is satisfied at the seventh sampling, it is ignored since it is already discriminated to be Class 1.

In the next ten samplings, the condition that three sampled values are TH2 or below is not satisfied, neither in the first five samplings nor in the subsequent five samplings. Since the condition that six/seven sampled values are TH1 or higher is satisfied at the sixth/seventh sampling, Class 2 is outputted as the final result of discrimination. This corresponds to the output of the state during the ten-sampling period.

Although it is not shown in the drawings, even when the condition that three sampled values obtained from five samplings are TH2 or below is provisionally satisfied, such is ignored if the condition that six/seven sampled values obtained from ten samplings are TH1 or higher" is already satisfied, and hence Class 2 is outputted as discrimination.

With this arrangement, when the seat load is fluctuated at the boundary between Class 1 and Class 2, high priority may be put to discrimination of Class 1. If it is desired to put high priority to discrimination of Class 2, for example, such condition that the six/seven sampled values obtained from ten samplings are TH2 or below, the requirement that three sampled values obtained from five samplings are TH1 or higher are discriminated to be Class 1 and Class 2, respectively, may be established.

In the above described examples, the numbers samples are multiples such as five and ten. However, it is not necessarily that they be multiples. For example, they may be five on one hand and nine on the other hand. In this case, for the discrimination with five samplings, all data may be effectively utilized by shifting the first sampling one behind, and performing samplings five times. In the case where they have a relation of multiples such as five and ten as well, it is also possible to perform six times of discrimination by shifting the first sampling one behind, not by performing discrimination with five samplings twice during the period of ten samplings.

In the description above, Class 1 (vacant seat) is regarded to have higher priority than Class 2 (a child is seated), and it is generally preferred. Normally, since the case where a child having the weight not much different from the vacant seat sits on the seat is rare, the threshold TH1 may be set to a low load and, in such a case, if the load is fluctuated around the threshold TH1, it is because the possibility that the seat is vacant is high.

As a condition of discrimination when the state is changed from Class 3 (an adult is seated) to Class 1 or Class 2, it is preferable to put priority to Class 1 before Class 2. It is because when the state is no longer Class 3, the possibility that the seat is vacant is much higher than the possibility that the seat is occupied by a child. On the other hand, as regards change between Class 1 and Class 2, it is preferable to avoid frequent change of the class by putting priority so as to keep the current state as much as possible in some cases. In this manner, it is possible to change priority of the state to be changed according to the current state.

While discrimination of Class 2 and Class 3 has been made using only one threshold TH3 in the description above, discrimination may be made by providing two thresholds in the logic described above. In such a case, it is also possible to increase the priority of Class 1 when the class is changed from Class 3 to Class 2 or to Class 1, and increase the priority of Class 3 when the class is changed from Class 1 to Class 2 or to Class 3. This corresponds to decrease the priority of the adjacent state. The reason why the priority of Class 3 is increased when the class is changed from Class 1 to Class 2 or Class 3 is because the probability of being seated by an adult is much higher than the probability of being seated by a child.

It may be adapted such that the higher priority is put to Class 3 than Class 2 for the seat having a higher probability of being seated by an adult, and the higher priority is put to Class 2 than Class 3 for the seat having a higher probability of being seated by a child depending on the seat.

The present invention includes methods to practicing the invention, software to practice the invention, and apparatuses configured to implement the present invention. Accordingly, the present invention includes a program product and hardware and firmware for implementing algorithms to practice the present invention, as well as the systems and methods described herein, and also for the control of the devices and implementation of the methods described herein.

It is noted that the term processor or controller, as used herein, encompasses both simple circuits and complex circuits, as well as computer processors. Furthermore, the scope of the present invention includes using the above described method in combination with a weight sensing system such as, for example, the system disclosed in U.S. Pat. No. 6,323,444 (incorporated by reference herein in its entirety). Other known weight system systems could also be employed.

The present application claims priority to Japanese Patent Application No. Japanese Patent Application 2003-340294, filed Sep. 30, 2003, the entire contents thereof, including the specification, drawings, claims and abstract, being incorporated herein by reference in its entirety.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A method of discriminating the state of an object on a vehicle seat, comprising the steps of:

taking a predetermined number of samples of a signal indicative of seat load;

provisionally determining that the state of the object is a second state if the taken samples indicate that the seat load exceeds a first load threshold in a manner that meets a first predetermined condition;

provisionally determining that the state of the object is a first state if the taken samples indicate that the seat load is less than a second load threshold in a manner that meets a second predetermined condition the same as or different than the first predetermined condition, wherein the second load threshold is higher than the first load threshold, and wherein the first state corresponds at least to a first range of seat loads and the second state corresponds to a second range of seat loads, the second range of seat loads including loads that are higher than the loads of the first range of seat loads; and discriminating the state of the object to be the first state or the second state, wherein the state of the object is discriminated:

to be the first state if it is provisionally determined that the state of the object is the first state and if it is not provisionally determined that the state of the object is the second state; and to be the second state if it is provisionally determined that the state of the object is the second state and if it is not provisionally determined that the state of the object is a first state.

2. The method of claim 1, further comprising:

identifying the first state or the second state as having priority;

discriminating the state of the object to be the first state if the first state has priority and if it is provisionally determined that the state of the object is the first state and the second state; and discriminating the state of the object to be the second state if the second state has priority and if it is provisionally determined that the state of the object is the first state and the second state.

3. The method of claim 1, wherein the first predetermined condition is that a number of samples out of the predetermined taken number of samples meets or exceeds a first predetermined value, and wherein the second predetermined condition is that a number of samples out of the predetermined taken number of samples meets or exceeds a second predetermined value.

4. The method of claim 3, wherein the first predetermined value is a number that is less than the second predetermined value.

5. A method of discriminating the state of an object on a vehicle seat, comprising:

taking a predetermined number samples of a signal and/or signals indicative of seat load;

provisionally determining that the state of the object is a second state if the taken samples indicate that the seat load exceeds a first load threshold in a manner that meets a first predetermined condition;

provisionally determining that the state of the object is a first state if the taken samples indicate that the seat load underruns a second load threshold in a manner that meets a second predetermined condition the same as or different than the first predetermined condition, wherein the second load threshold is higher than the first load threshold, and wherein the first state corresponds at least to a first range of seat loads and the second state corresponds to a second range of seat loads, the second range of seat loads including loads that are higher than the loads of the first range of seat loads;

identifying the first state or the second state as having priority;

discriminating the state of the object to be the first state if the first state is identified as having priority and if it is provisionally determined that the state of the object is the first state before it is provisionally determined that the state of the object is the second state while taking samples; and discriminating the state of the object to be the second state if the second state is identified as having priority and if it is provisionally determined that the state of the object is the second state before it is provisionally determined that the state of the object is the first state while taking samples.

6. The method of claim 5, wherein the first predetermined condition is that a number of samples out of the predetermined taken number of samples meets or exceeds a first predetermined value, and wherein the second predetermined condition is that a number of samples out of the predetermined taken number of samples meets or exceeds a second predetermined value.

7. The method of claim 5, wherein:

the first predetermined condition is that m×i samples exceed the first threshold n×i times, wherein m, i and n are natural numbers and wherein m>n; and wherein the second predetermined condition is that m×k samples underrun the second threshold by n×k times, wherein k is a natural number.

8. A method of discriminating the state of an object on a vehicle seat at a second time, comprising:

serially discriminating the state of the object according to the method of claim 2 a plurality of times including a second time and a first time serially immediately before the first time, wherein identifying the first state or the second state as having priority includes:

identifying the first state as having priority if the object was discriminated to be the first state at the first time; and identifying the second state as having priority if the object was discriminated to be the second state at the second time.

9. The method of claim 1, further comprising:
provisionally determining that the state of the object is a third state if the taken samples indicate that the seat load exceeds a third load threshold in a manner that meets a third predetermined condition the same as or different than the first predetermined condition or the second predetermined condition, wherein the third load threshold is higher than the first load threshold and the second load threshold, and wherein the third state corresponds at least to a third range of seat loads, the third range of seat loads including loads that are higher than the loads of the first range of seat loads and the second range of seat loads; and
discriminating the state of the object to be the third state if it is provisionally determined that the state of the object is the third state and if it is not provisionally determined that the state of the object is the second state or the first state.

10. A method of discriminating the state of an object on a vehicle seat at a second time, comprising:
serially discriminating the state of the object according to the method of claim 9 a plurality of times including a second time and a first time serially immediately before the first time;
discriminating the state of the object to be the first state if it is provisionally determined that the state of the object is the first state and the second state if the object was discriminated to be the third state at the first time; and
discriminating the state of the object to be the third state if it is provisionally determined that the state of the object is the second state and the third state if the object was discriminated to be the third state at the first time.

11. The method of claim 2, wherein the first state has priority.

12. A method of determining the occupancy status of a vehicle seat, comprising:
discriminating the state of an object according to claim 1; and
determining that the seat is vacant if the state of the object is discriminated to be the first state.

13. A method of determining the occupancy status of a vehicle seat, comprising:
discriminating the state of an object according to claim 1;
determining that the seat is vacant if the state of the object is discriminated to be the first state; and
determining that the seat is not vacant if the state of the object is discriminated to be the second state.

14. The method of claim 13, further comprising:
setting a deployment setting on an airbag deployment device to deploy in one or more deployment modes or to not deploy based on at least one of the determination that the seat is vacant and the determination that the seat is not vacant.

15. A method of determining the occupancy status of a vehicle seat, comprising:
discriminating the state of an object according to claim 9; and
setting a deployment setting on an airbag device according to the following modes:
to not deploy if the state of the object is discriminated to be the first state;
to deploy in a soft-deployment mode if the state of the object is discriminated to be the second state; and
to deploy in a normal deployment mode if the state of the object is discriminated to be the third state.

16. The method of claim 1, wherein the seat load comprises the weight of the seat and the object on the vehicle seat.

17. The method of claim 1, wherein the seat load comprises the weight of the object on the vehicle seat and not the weight of the seat.

18. An apparatus for discriminating the state of an object on a vehicle seat, comprising:
a seat weight sensing system;
a controller configured to receive input signals from the seat weight sensing system indicative of a seat load and configured to take a predetermined number of samples of one or more signals; wherein the controller is configured to:
provisionally determine that the state of the object is a second state if the taken samples indicate that the seat load exceeds a first load threshold in a manner that meets a first predetermined condition;
provisionally determine that the state of the object is a first state if the taken samples indicate that the seat load is less than a second load threshold in a manner that meets a second predetermined condition the same as or different than the first predetermined condition, wherein the second load threshold is higher than the first load threshold, and wherein the first state corresponds at least to a first range of seat loads and the second state corresponds to a second range of seat loads, the second range of seat loads including loads that are higher than the loads of the first range of seat loads;
discriminate the state of the object to be the first state if it is provisionally determined that the state of the object is the first state and if it is not provisionally determined that the state of the object is the second state; and
discriminate the state of the object to be the second state if it is provisionally determined that the state of the object is the second state and if it is not provisionally determined that the state of the object is a first state.

19. The apparatus of claim 18, wherein the controller includes is configured to:
identify the first state or the second state as having priority;
discriminate the state of the object to be the first state if the first state has priority and if it is provisionally determined that the state of the object is the first state and the second state; and
discriminate the state of the object to be the second state if the second state has priority and if it is provisionally determined that the state of the object is the first state and the second state.

20. The apparatus of claim 18, wherein the controller is programmed so that the first predetermined condition is that a number of samples out of the predetermined taken number of samples meets or exceeds a first predetermined value, and that the second predetermined condition is that a number of samples out of the predetermined taken number of samples meets or exceeds a second predetermined value.

21. The apparatus of claim 18, wherein the controller is adapted to output a signal to an airbag device to set a deployment setting on the airbag device according to the following modes:
to not deploy if the state of the object is discriminated to be the first state;

to deploy in a soft-deployment mode if the state of the object is discriminated to be the second state; and to deploy in a normal deployment mode if the state of the object is discriminated to be the third state.

22. The apparatus of claim 21, further comprising the airbag device, wherein the airbag device is in electrical communication with the controller.

23. An apparatus for discriminating the state of an object on a vehicle seat, comprising:

a controller adapted to receive input signals from a seat load meter indicative of a seat load and to take a predetermined number of samples of one or more signals; wherein the controller is configured to:

provisionally determine that the state of the object is a second state if the taken samples indicate that the seat load exceeds a first load threshold in a manner that meets a first predetermined condition;

provisionally determine that the state of the object is a first state if the taken samples indicate that the seat load is less than a second load threshold in a manner that meets a second predetermined condition the same as or different than the first predetermined condition, wherein the second load threshold is higher than the first load threshold, and wherein the first state corresponds at least to a first range of seat loads and the second state corresponds to a second range of seat loads, the second range of seat loads including loads that are higher than the loads of the first range of seat loads;

identify the first state or the second state as having priority;

discriminate the state of the object to be the first state if the first state is identified as having priority and if it is provisionally determined that the state of the object is the first state before it is provisionally determined that the state of the object is the second state while taking samples; and discriminate the state of the object to be the second state if the second state is identified as having priority and if it is provisionally determined that the state of the object is the second state before it is provisionally determined that the state of the object is the first state while taking samples.

24. The apparatus of claim 23, wherein the controller is configured so that the first predetermined condition is that a number of samples out of the predetermined taken number of samples meets or exceeds a first predetermined value, and that the second predetermined condition is that a number of samples out of the predetermined taken number of samples meets or exceeds a second predetermined value.

25. The apparatus of claim 24, wherein the controller is configured to: provisionally determine that the state of the object is a third state if the taken samples indicate that the seat load exceeds a third load threshold in a manner that meets a third predetermined condition the same as or different than the first predetermined condition or the second predetermined condition, wherein the third load threshold is higher than the first load threshold and the second load threshold, and wherein the third state corresponds at least to a third range of seat loads, the third range of seat loads including loads that are higher than the loads of the first range of seat loads and the second range of seat loads; and discriminate the state of the object to be the third state if it is provisionally determined that the state of the object is the third state and if it is not provisionally determined that the state of the object is the second state or the first state.

26. The apparatus of claim 23, further comprising the airbag device, wherein the controller is adapted to output a signal to an airbag device to set a deployment setting on the airbag device according to the following modes:

to not deploy if the state of the object is discriminated to be the first state;

to deploy in a soft-deployment mode if the state of the object is discriminated to be the second state; and to deploy in a normal deployment mode if the state of the object is discriminated to be the third state; wherein the airbag device is in electrical communication with the controller.

27. An apparatus for discriminating the state of an object on a vehicle seat, comprising:

a controller adapted to receive input signals from a seat load meter indicative of a seat load and to take a predetermined number of samples of one or more signals; wherein the controller is configured to:

provisionally determine that the state of the object is a second state if the taken samples indicate that the seat load exceeds a first load threshold in a manner that meets a first predetermined condition;

provisionally determine that the state of the object is a first state if the taken samples indicate that the seat load underruns a second load threshold in a manner that meets a second predetermined condition the same as or different than the first predetermined condition, wherein the second load threshold is higher than the first load threshold, and wherein the first state corresponds at least to a first range of seat loads and the second state corresponds to a second range of seat loads, the second range of seat loads including loads that are higher than the loads of the first range of seat loads;

provisionally determine that the state of the object is a third state if the taken samples indicate that the seat load exceeds a third load threshold in a manner that meets a third predetermined condition the same as or different than the first predetermined condition or the second predetermined condition, wherein the third load threshold is higher than the first load threshold and the second load threshold, and wherein the third state corresponds at least to a third range of seat loads, the third range of seat loads including loads that are higher than the loads of the first range of seat loads and the second range of seat loads;

identify priorities for the first state, the second state or the third state, wherein only one state has a highest priority;

discriminate the state of the object to be the first state if the first state is identified as having the highest priority and if it is provisionally determined that the state of the object is the first state before it is provisionally determined that the state of the object is the second state while taking samples; and discriminate the state of the object to be the second state if the second state is identified as having the highest priority and if it is provisionally determined that the state of the object is the second state before it is provisionally determined that the state of the object is the first state while taking samples;

discriminate the state of the object to be the third state if the third state is identified as having the highest priority and if it is provisionally determined that the state of the object is the second state before it is provisionally determined that the state of the object is the first state while taking samples;

wherein the controller is programmed so that the first predetermined condition is that a number of samples out of the predetermined taken number of samples meets or exceeds a first predetermined value, and that the second predetermined condition is that a number of samples out of the predetermined taken number of samples meets or exceeds a second predetermined value, and that the third predetermined condition is that a number of samples out of the predetermined taken number of samples meets or exceeds a second predetermined value.

* * * * *